United States Patent [19]

Antoszewski

[11] Patent Number: 4,667,805
[45] Date of Patent: May 26, 1987

[54] ROBOTIC PART PRESENTATION SYSTEM

[75] Inventor: Richard S. Antoszewski, Glenshaw, Pa.

[73] Assignee: Westinghouse Electric Corp., Pittsburgh, Pa.

[21] Appl. No.: 795,686

[22] Filed: Nov. 6, 1985

[51] Int. Cl.[4] .................................. B65G 47/26
[52] U.S. Cl. ...................... 198/345; 269/118; 269/233; 271/238; 414/781; 198/403; 198/434
[58] Field of Search .............. 198/345, 434, 403; 414/36, 773, 781, 783; 269/111, 118, 119, 233; 271/221, 222, 238, 239, 236

[56] References Cited

U.S. PATENT DOCUMENTS

| | | | |
|---|---|---|---|
| 2,992,823 | 7/1961 | Forrester | 271/222 |
| 3,314,554 | 4/1967 | Cuniberti | 198/434 X |
| 3,638,564 | 2/1972 | Prange et al. | 198/434 X |
| 4,228,993 | 10/1980 | Cathers | 198/434 X |
| 4,452,351 | 6/1984 | Meeker | 198/434 |
| 4,493,412 | 1/1985 | Krehnovi | 198/434 |
| 4,548,399 | 10/1985 | Heider et al. | 271/221 |

FOREIGN PATENT DOCUMENTS

| | | | |
|---|---|---|---|
| 49571 | 4/1977 | Japan | 198/434 |
| 64368 | 6/1978 | Japan | 271/238 |

Primary Examiner—Jeffrey V. Nase
Attorney, Agent, or Firm—Thomas R. Trempus

[57] ABSTRACT

The invention is a robotic parts presentation system for delivering a workpiece into a work envelope of an industrial manipulator. This system also centers the delivered workpiece about the centerline of the workpiece in the X and Y axes directions thereof. The invention provides an accurate system for the location of the part with respect to a programmed pickup point for acquisition by an industrial manipulator. The system comprises in combination a centering device which is disposed within the work envelope of the industrial manipulator and a flip-over mechanism for delivering the workpiece from a transfer station outside of the work envelope onto the centering device.

3 Claims, 4 Drawing Figures

ROBOTIC PART PRESENTATION SYSTEM

BACKGROUND OF THE INVENTION

1. Field of the Invention

This invention relates to robotic feeders in general and particularly as directed to a system whereby a part is transferred from a location outside of the work envelope of an industrial manipulator to a location within the work envelope. This invention further includes a part centering device disposed within the work envelope and adapted to center the part delivered thereto about a centerline of the part defined by the X and Y axis thereof. This system can transport various sizes and shapes of material into the work envelope and center that material regardless of its size and shape thus permitting an accurate and repeatable acquisition by the robot.

2. Description of the Prior Art

The general acceptance of industry automation as an essential requirement for improving productivity has increased the acceptance level of the robot or industrial manipulator apparatus as a mechanism for achieving automated industrial applications. The acceptance of robots as a useful, industrial "tool" has resulted in a marked demand for robotic systems capable of implementing what have heretofore been either difficult, dangerous or tedious tasks.

The automotive industry presents exceptional opportunities for the use of robots or industrial manipulators for the purpose of improving productivity and enhancing quality of the finished product. What were once routine tasks are now efficiently and effectively being implemented by robots working side by side with their human worker counterparts. For example, robots are now used to apply adhesives and sealing materials to various component parts of an automobile. Robots are also used to move heavy component parts and weld the various component parts of an automobile together as well as applying the final coating of paint to the automobile. Certain tasks, however, have heretofore not lent themselves to automation. One example of such a task is the insertion or decking of windshields into vehicles. Several obvious factors have prohibited the automation of the decking process. A high level of accuracy is necessary in order to place the somewhat fragile windsheld into the windshield opening of the vehicle. A slight miscalculation during the decking process can result in damage to both the vehicle and possible destruction of the windshield. Additionally, the existing conveyors which transport the automobile through the various work stations in an automobile assembly facility are relatively unstable and tend to cause a slight change in the orientation of the vehicle mounted thereon. Moreover, typically the nearly complete vehicle into which the windshield is to be inserted is positioned on the conveyor apparatus in such a way as to render the exact location of the windshield opening to be consistently unknown. In other words, there is a certain level of random orientation of the vehicle on the assembly line during the stage in which the windshield is to be inserted. As a result, the decking operation has heretofore been accomplished through the use of two or more workmen engaging a windshield with handheld lifting equipment and walking across the assembly line so that one worker is along either side of the vehicle. The windsheld is then manually inserted into the windshield opening. During this process, workmen on either side of the vehicle walk alongside the vehicle as it passes through the windshield insertion station to match the speed of the vehicle and then insert the windshield. This technique does have the advantage of effecting windshield placement, while permitting the existing conveyor system to continuously transport the vehicle through the decking station.

In order to effect the automated insertion of a component part into a product, it is necessary to initially know both the exact orientation and location of the component part as well as the exact orientation and location of the product into which that part is to be inserted. With this information, the orientation of a component part can be established and once acquired by an industrial manipulator, the insertion of the component part into the product can be easily and quickly accomplished. Thus, in a robotic assembly or material handling system, the placement accuracy of parts or components is not only a function of robot repeatability but is directly proportional to the position of the part when it is picked up by the robot. Typically, manually loaded fixtures or mechanical devices are used to bias parts against two perpendicular sides of the component part. However, when such a technique is utilized, variations in size or shape from one component to another will cause the position of the component to change with respect to the pickup position of the robot arm. Man-to-machine interface of such devices can also be extremely dangerous since loading the fixture in which the component part is centered requires entry into the robot work zone.

Several schemes have been suggested for devices which can improve part placement in robotic assembly in handling systems. For example, mechanical alignment mechanisms have been added directly to a gripper. This technique will generally dedicate the gripper to a specific component part. Moreover, the additional weight of the alignment mechanism to the gripper assembly reduces the load carrying capacity of the robot. It has also been suggested that external sensors such as vision, sonic, etc. be employed to define the size, shape and location of the part and that the gripper orientation be adjusted for part pickup. This method, unfortunately, requires an increased cost and system complexity not to mention the fact that the accuracy obtained thereby can be limited. It has also been suggested that the part or component design be modified in order to render the part self-locating. This technique, when feasible, is limited to the amount of mismatch that is possible and may require compromises in both the appearance or functionality of the completed assembly.

It is, therefore, an object of this invention to provide a robotic part presentation station which offers a unique solution to the difficulties incurred during part pickup and placement.

It is a further object of this invention to provide a centering device upon which a workpiece can be centered about a central line in the X and Y axes direction of that workpiece. This provides an accurate location with respect to a programmable pickup point for acquisition by an industrial manipulator independent of the size and shape of the object being centered.

It is another object of this invention to provide a system whereby a component part can either be manually loaded or interfaced with a conveyor, counterbalanced stack of parts, indexing scissors table or similar such device to provide totally automatic parts feeding.

It is yet another object of this invention to provide a robotic part presentation station which transports the component part into the work envelope, permitting man-robot interface without the need for the man to enter or reach into the work envelope of the robot.

It remains another object of this invention to provide a device which has centering action that will occur on any part that can fit in the nest defined therein and is larger than the minimum nest opening of the device. Moreover, the range of part sizes that the nest will accept can be large and can be expanded by increasing the stroke of the centering arms. This centering station will center all parts that are symmetric in shape about the X and Y axes.

SUMMARY OF THE INVENTION

The invention is a robotic parts presentation system for delivering a workpiece into a work envelope of an industrial manipulator. This system also centers the delivered workpiece about the centerline of the workpiece in the X and Y axes directions thereof. The invention provides an accurate system for the location of the part with respect to a programmed pickup point for acquisition by an industrial manipulator. The system comprises in combination a centering device which is disposed within the work envelope of the industrial manipulator and a flip-over mechanism for delivering the workpiece from a transfer station outside of the work envelope onto the centering device.

The centering device includes a base member having the substantially planar top portion which defines thereon the programmable pickup point of the industrial manipulator. Anti-friction roller means extend upwardly from the top portion of the base means and are adapted to supportably receive thereon the workpiece such that the workpiece is movable relative thereto. A first pair of X-axes arms are slidably mounted on the top portion of the base means by means of tracks for reciprocal movement toward and away from the fixed point. A second pair of X-axes arms are slidably mounted in an opposed relationship relative to the first pair of X-axes arms on the top portion of the base means for reciprocal movement toward and away from the fixed point. A first multiple face cam means is in mechanical communication with the first and second pair of X-axes arms for effecting the reciprocal movement thereof. A first pair of Y-axes are slidably mounted on the top portion of the base means by means of tracks for reciprocal movement toward and away from the fixed point. A second pair of Y-axes arms are slidably mounted in opposed relationship relative to the first pair of Y-axes arms on the top portion of the base means for reciprocal movement toward and away from the aforedescribed fixed point. A second multiple face cam means is in mechanical communication with the first and second pairs of Y-axes arms for effecting the reciprocal movement thereof. A drive means is dispsoed in the base means and is in mechanical communication with the first and second multiple face cam means by means of separate adjustable friction clutch means. Also, the drive means is reversible in order to effect the aforedescribed reciprocal movement of the pair of X-axes arms and Y-axes arms. Accordingly, when a workpiece is resting on the anti-friction roller means it is centered with respect to the fixed point through the engagement thereof by the first and second pairs of X and Y-axes arms during the movement of these arms toward the fixed point.

The flip-over mechanism for delivering the workpiece to the centering device includes a drive means housing disposed between the transfer station and the centering device. A flip-over arm is rotatably mounted on the drive means housing for reciprocal movement between the transfer station and the centering device. This flip-over arm includes a cantilevered arm portion onto which an end effector is disposed. The end effector is adapted to releasably engage the workpiece to be delivered to the centering device. Drive means are mechanically coupled with the flip-over arm for effecting the aforedescribed reciprocal movement thereof.

BRIEF DESCRIPTION OF THE DRAWINGS

The above as well as other features and advantages of the present invention can be more fully appreciated through consideration of the detail description of the preferred embodiment in conjunction with the several drawings in which.

DESCRIPTION OF THE PREFERRED EMBODIMENT

The robotic part presentation system of this invention is a generic robot feeder. It transports various sizes and shapes of material into the robotic work envelope, and centers the material regardless of size and shape about a fixed point, permitting accurate and repeatable pickup by the robot. The present invention while particularly dedicated to a windshield insertion system should be appreciated for its general applicability as a generic robot feeder. While the specific application of the concepts disclosed herein are dedicated to a windshield presentation and centering system for use in combination with a work station for the decking of a windshield into a windshield opening in an automobile on a moving assembly line, it should be appreciated that the concepts which are disclosed herein can be readily adapted for use in any type of assembly process in which a component part must be centered after delivery into a work envelope in an assembly area. Thus, the use of the concepts of this invention and the specific elements of the system described herein can be the object of any of a variety of automated assembly systems.

Figure 1:
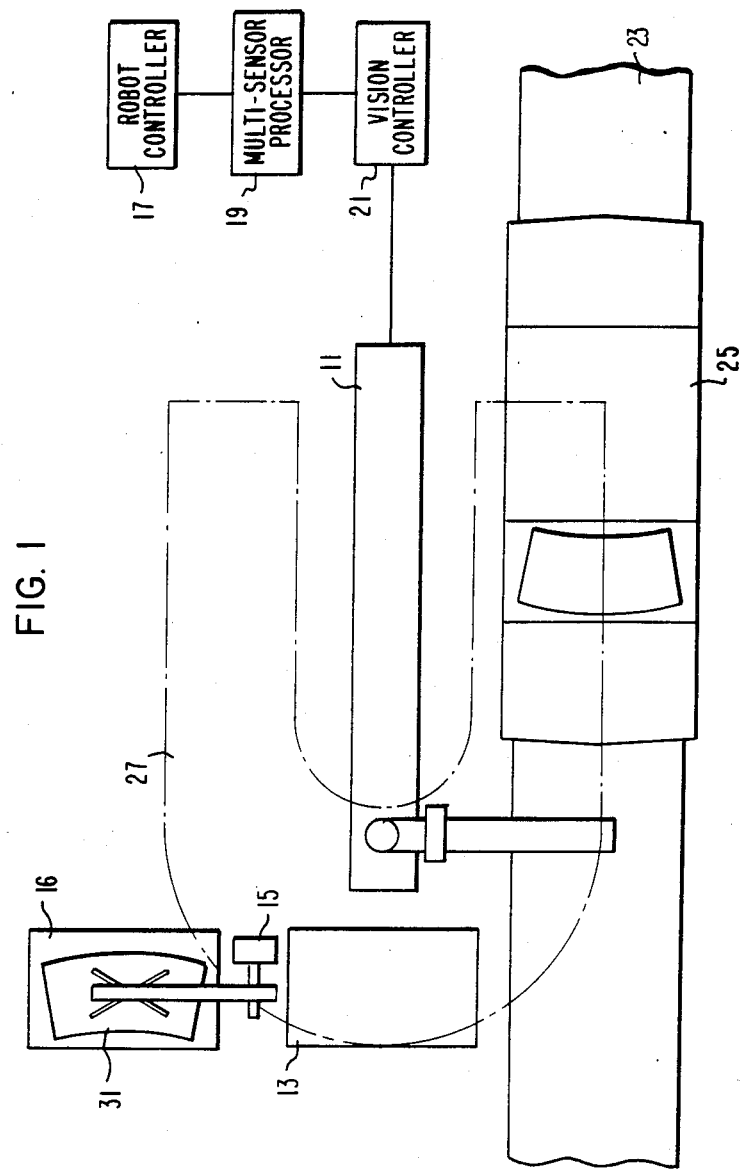
FIG. 1 is a schematic plan view of a windshield insertion system for a moving vehicle which incorporates the robotics parts presentation system according to the teachings of this invention.

A rather schematic plan view of a windshield insertion system incorporating the robotic parts presentation system of this invention can be seen in FIG. 1. Generally speaking, this system includes several major components. Among these components are the industrial manipulator 11, a centering mechanism 13, a flip-over mechanism 15 for the delivery of workpieces from a transfer station outside 16 of the work envelope onto the centering device 13, a robot controller 17, a multi-sensor processor 19 and a vision controller 21. The schematic representation also illustrates a conveyor means 23 adjacent the industrial manipulator 11 and a vehicle 25 disposed in the conveyor means 23.

A system incorporating the teachings of this invention has been designed and constructed with the use of a Unimation 6000 Series gantry robot. U.S. Pat. No.

4,571,149, issued Feb. 18, 1986 and entitled "General Purpose Orthogonal Axes Manipulator System" by Daniel P. Soroka et al., which is assigned to the assignee of the present invention, discloses this overhead gantry-style robot. This robot is characterized by a large rectangular working envelope which extends to both sides of the gantry. This robot permits programming in Cartesian coordinates and its design provides a rigid manipulator that can support machine tool-type interpolation moves with high accuracy and repeatability while permitting robotic-type velocity and dexterity.

Figure 2:
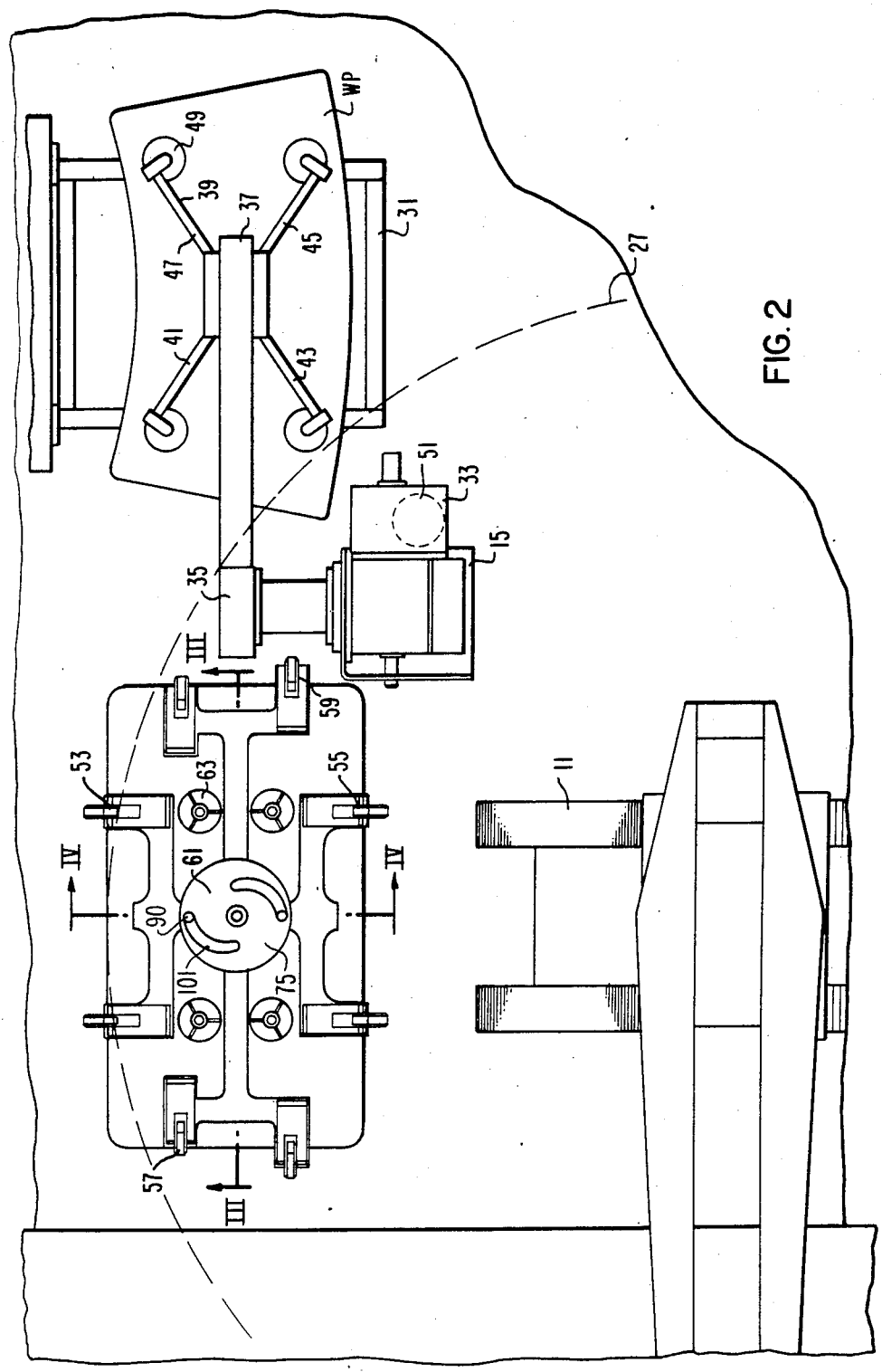
FIG. 2 is a plan view of the flip-over mechanism and the centering table assembly and a section of the series 6000 robot in a systems application all according to the teachings of this invention.
Figure 3:
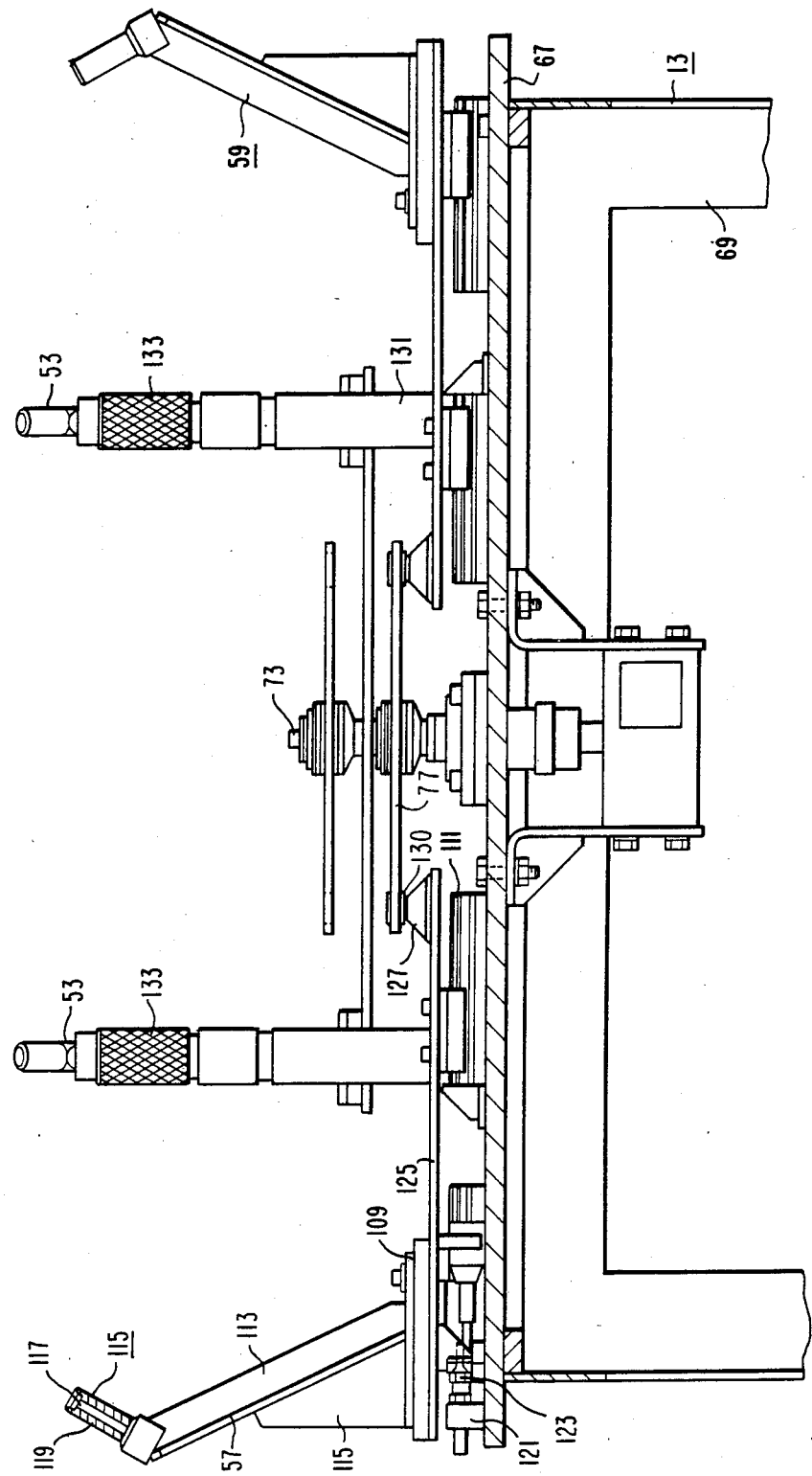
FIG. 3 is an elevational view along lines III—III of FIG. 2.
Figure 4:
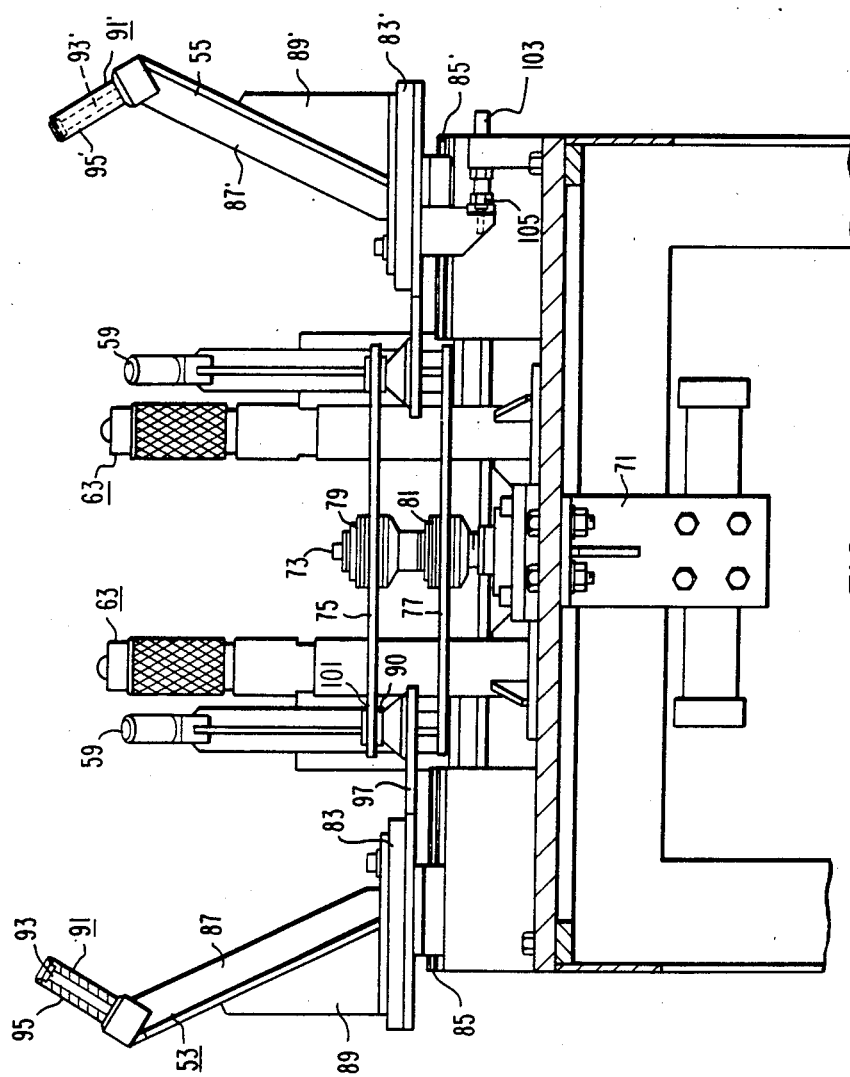
FIG. 4 is an elevational view along lines IV—IV of FIG. 2.

Considering now FIGS. 2 through 4 a more detailed appreciation of the mechanisms by which the flip-over device and centering device function can be obtained. A flip-over mechanism generally indicated by the reference character 15 delivers a workpiece from a transfer station indicated at 31 to the work envelope 27 (shown in dashed lines) of the industrial manipulator 11. Flip-over mechanism 15 includes a drive means housing 33 secured to the floor of the work station. A flip-over arm 35 is pivotally mounted on the housing 33 for reciprocal movement between the transfer station 31 and the centering device 13. The flip-over arm 35 has a cantilevered portion 37 onto which is secured an end effector generally indicated at 39. This end effector preferably includes four arm-like members 41, 43, 45 and 47 onto which end effectors 49 are slidably mounted. Because the end effectors are slidably mounted on the individual arms 41 through 47, the end effector unit 39 can be adjusted to accommodate workpieces WP having varying dimensions. In the work station devised for the insertion of windshelds into a automobile, these end effectors 49 are vacuum devices which attach to the windshield and hold the windshield during the flip-over procedure. It should be appreciated that the end effectors 49 could easily be pneumatically, hydraulically or electrically actuated mechanical devices or magnetic devices depending, of course, upon the nature of the workpiece to be manipulated. Thus, the end effector means disposed on the cantilevered arm portion of the flip-over arm are adapted to releasably engage the workpiece to be delivered from the transfer station to the centering device. The housing 15 also includes a drive means 51 coupled to the flip-over arm 35 for effecting the aforedescribed reciprocal movement of the flip-over arm from the transfer station to the centering device. This reciprocal movement can be effected by means of a drive means which is reversible or the reversing motion can be provided by means of a gear train disposed between the drive means and the flip-over arm.

The centering device 13 is somewhat schematically represented in FIG. 2 while a more detailed appreciation of the mechanisms of this device can be had in FIGS. 3 and 4. Briefly considering FIG. 2, however, the centering device 13 can be seen to have a first and second pair of X-axes arms generally indicated at 53 and 55. A first pair and a second pair of Y-axes arms are indicated at 57 and 59, respectively. A cam means at 61 by which the reciprocal movement of the X-axes and Y-axes arms is effected is also shown. The anti-friction roller means 63 of the centering device are also shown disposed about the cam means 61. As will be described in detail hereinafter, the anti-friction roller means 63 define an elevated nest. In considering FIG. 2 it can be seen that when the flip-over arm 35 of the flip-over mechanism 15 is pivoted from the transfer station 31 to the centering device 13, the flip-over arm will rest between the elevated anti-friction roller means 63. Thus, during actual operations when the workpiece WP is delivered to the centering device 13, the workpiece rests on the elevated anti-friction roller means 63. The flip-over arm remains in the nest defined by the anti-friction roller means 63 while the centering action takes place. Upon the acquisition of the workpiece by the end effector of the industrial manipulator 11, the flip-over arm can be pivoted from within the nest of the centering device back to the transfer station for the acquisition of the next workpiece. It can be noticed that each of the pair of arms 57 and 59 of the Y-axes pair are offset with respect to each other. This offset is due to the shape of the windshield or workpiece WP. Therefore, it can be appreciated that the arms can be positioned so as to accommodate a particular workpiece or an oddly shaped workpiece as is the case with a windshield.

Considering now FIGS. 3 and 4, the centering assembly 13 includes a generally planar portion 67 supported by an elevated base member 69. The base member 69 houses the drive means 71 from which drive shaft 73 extends upwardly through the planar member 67. A single drive unit which can be an air or electric powered rotary actuator drives the central shaft 73. The central drive means 71 is capable of reversing the rotational direction of the central shaft 73. This direction reversal is necessary to implement the reciprocal movement of the X and Y-axes arms disposed on the table top 67. An X-axes cam means 75 and a Y-axes cam means 77 are mounted on the central shaft 73 by means of adjustable friction clutches 79 and 81, respectively.

Consideroig first the construction of the X-axes arms, the pair of X-axes arms indicated generally by the reference character 53 include a base portion 83 adapted to slidably engage the rail system 85 fixedly mounted onto the planar portion 67 of the centering device. Extending upwardly and angularly outwardly from the central shaft 73 is a cantilevered arm 87 which can be supported by a gusset 89. A finger-like portion 91 extends upwardly and somewhat toward the center of the centering device 13. This finger 91 includes a shaft portion 93 about which a cap 95 is rotatably mounted. As will be seen through a description of the actual centering operation, the rotational finger-like gripping cap 95 of the finger 91 facilitates the centering operation. The base portion 83 includes an extending arm-like member 97 which has a cam follower 90 disposed at the end thereof. This cam follower 90 is adapted for travel about the contoured face 101 of the cam member 75 (as seen in FIG. 2).

The opposed pair of X-axes arms 55 is similarly constructed with like components indicated by primed reference characters. The X-axis arm 55 is also provided with a mechanical stop means 103 which can incorporate therein a sensor means 105 to detect the end of travel limits of the X-axes arms 53 and 55. The signal generated by the end-of-travel sensor means 105 can be utilized in the programmed operation of the system in order to determine the operational status of the centering device.

The Y-axes arms 57 and 59 are also mounted for reciprocal movement on the top planar portion 67 of the centering assembly 13. Considering Y-axis arm 57, it can be seen that a base member 109 is slidably mounted for travel on tracks 111. The Y-axis arm 57 includes an upwardly and slightly outwardly extending arm portion 113 which can be supported by gussets 115. A finger-like portion 115 extends upwardly from the free end of arm 113 and slightly inwardly toward the central shaft 73. The finger-like member 115 includes a center shaft 117 about which an outwardly disposed member 119 is rotatably mounted. An end-of-travel stop means 121 is disposed at the edge of the table 67 for contact by the base portion 109 of the Y-axis arm 57 during the outward travel of the arm. This stop means 121 can also include a sensor means 123 for indicating that the end-of-travel limit of the Y-axes arms has been established. The base member 109 further includes an inwardly extending portion 125 with a cam follower 127 thereon adapted for travel about the cam face 130 of the cam means 77.

The pair of Y-axes arms 59 are similarly constructed with like elements being indicated by like primed numbers.

As can be clearly seen in the plan view of FIG. 2, each of the pair of X and Y-axes arms includes two elevated arms which are supported by the base member which extends to both the right and left of the track means on which the respective arms travel. Thus, four individual arms are provided in elevational relationship to effect the centering of a workpiece along one axes.

The anti-friction roller means 63 include an elongated elevational member 131 which extends upwardly from the planar portion 67 of the centering table 13. There is provided a removable anti-friction roller means 133 onto the elevated member 131. It should be appreciated that the contour of the workpiece being centered may vary. Thus, the roller means 133 is threadedly connected with the elevational member 131 and provides a means for adjusting the height of the roller above the planar portion 67. As discussed above. it can now be seen through the elevational view of FIGS. 3 and 4 that the anti-friction roller means 63 define therebetween a nest in which the arm 35 of the flip-over mechanism 15 can rest.

The single drive unit actuates the two cam plates 75 and 77 thus driving the two sets of sliding members toward the center shaft 73. The X-axes members are mechanically linked to each other and slide along the rails. Similarly, the Y-axes are mechanically linked to each other and also slide along rails. When the rollers on both sides of either set of slides come in contact with a workpiece resting on the anti-friction roller means, controlled slippage occurs between the central shaft and the cam plate. The central shaft continues to rotate thus driving the second set of slide rollers toward the part. As these rollers push the part to its center position, the antifriction bearings in the rollers of the first side, i.e., the finger members 91 and 91' of the X axis or fingers 115 and 115' of the Y axis allow the part to pass through the first set of slides. When the part comes to rest, the central drive slips with respect to the second cam plate as well as the first cam plate until it comes to the end of its travel. At this point, the workpiece is centered and captive between the finger-like rollers of both the X and Y-axes slides. The rolelrs of the X and Y-axes slides exert a controllable retaining force on the workpiece.

After the robot grips the part, a signal from the robot or the system control causes the central drive to rotate in the opposite direction thus releasing the part. The X- and Y-axis slides separate until they hit and end-of-travel hard stop. Slippage between the central drive shaft and the cam plates resets the relative position between the cam plates and the drive shaft and prepares the unit for the next cycle.

If the next part to be centered is smaller, the slides will travel further before slippage occurs. Similarly, if the next part is larger, slippage will occur sooner. The torque drive required for slippage is adjustable via commercially available slip clutches and is proportional to the retaining force exerted by the slide rollers when the part comes to rest.

What has been described is a robotic part presentation station which is in effect a generic robot feeder. It transports various sizes and shapes of material into the work envelope and centers the material about a fixed point thus permitting an accurate and repeatable pickup by robot.

I claim:

1. An automated part centering system for centering a workpiece in a predetermined orientation relative to a fixed point for acquisition by a robot or the like, said system comprising:
    a base means having a substantially planar top portion which defines thereon said fixed point;
    anti-friction roller means extending upwardly from the top portion and adapted to supportably receive thereon the workpiece, such that the workpiece is movable relative thereto;
    a first pair of X-axes arms slidably mounted on the top portion for reciprocal movement toward and away from said fixed point;
    a second pair of X-axes arms slidably mounted in an opposed relationship relative to said first pair of X-axes arms on the top portion for reciprocal movement toward and away form said fixed point;
    a first multiple face cam means in mechanical communication with said first and second pair of X-axes arms for effecting the reciprocal movement thereof;
    a first pair of Y-axes arms slidably mounted on the top portion for reciprocal movement toward and away from said fixed point;
    a second pair of Y-axes arms slidably mounted in an opposed relationship relative to said first pair of Y-axes arms on the top portion for reciprocal movement toward and away from said fixed point;
    a second multiple face cam means in mechanical communication with said first and second pairs of Y-axes arms for effecting the reciprocal movement thereof; and
    drive means disposed in said base member and in mechanical communication with said first and second multiple face cam means by means of separate adjustable friction clutch means to permit controlled slippage between said drive means and the cam means, said drive means being reversible in order to effect the aforesaid reciprocal movement, wherein a workpiece resting on said anti-friction roller means is centered with respect to said fixed point through the engagement thereof by said first and second pairs of X and Y-axes arms during the movement thereof toward said fixed point.

2. The automated part centering system according to claim 1 wherein the first and second opposed pairs of X and Y axes arms include extending finger like members having a rotatable sleeve thereon which engages the workpiece.

3. A robotic parts presentation system for delivering a workpiece into a work envelope of an industrial manipulator and for centering the delivered workpiece about its centerline in the X and Y-axes direction, providing an accurate location with respect to a predetermined pickup point for acquisition by said industrial manipulator, said system comprising in combination:

I. a centering device disposed within the work envelope of said industrial manipulator, said centering device comprising:

a base means having a substantially planar top portion which defines thereon said fixed point;

anti-friction roller means extending upwardly from the top portion and adapted to supportably receive thereon the workpiece, such that the workpiece is movable relative thereto;

a first pair of X-axes arms slidably mounted on the top portion for reciprocal movement toward and away from said fixed point;

a second pair of X-axes arms slidably mounted in an opposed relationship relative to said first pair of X-axes arms on the top portion for reciprocal movement toward and away from said fixed point;

a first multiple face cam means in mechanical communication with said first and second pair of X-axes arms for effecting the reciprocal movement thereof;

a first pair of Y-axes arms slidably mounted on the top portion for reciprocal movement toward and away from said fixed point;

a second pair of Y-axes arms slidably mounted in an opposed relationship relative to said first pair of Y-axes arms on the top portion for reciprocal movement toward and away from said fixed point;

a second multiple face cam means in mechanical communication with said first and second pairs of Y-axes arms for effecting the reciprocal movement thereof; and first drive means disposed in said base member and in mechanical communication with said first and second multiple face cam means by means of separate adjustable friction clutch means to permit controlled slippage between said first drive means and the cam means, said drive means being reversible in order to effect the aforesaid first reciprocal movement;

II. a flip-over mechanism for the delivery of the workpiece from a transfer station outside of the work envelope onto said anti-friction roller means of said centering device, comprising:

a second drive means disposed between the transfer station and said centering device;

a flip-over arm rotatably mounted on said second drive means for reciprocal rotational movement between the transfer station and said centering device, and including a cantilevered arm portion; and an end effector means disposed on said cantilevered arm portion and adapted to releasably engage the workpiece to be delivered;

wherein the workpiece delivered by the flip-over mechanism and resting on said anti-friction roller means is centered with respect to said fixed point through the engagement thereof by said first and second pair of X and Y-axes arms during the movement thereof toward said fixed point.

* * * * *